(12) United States Patent
Mitchel et al.

(10) Patent No.: US 10,935,476 B2
(45) Date of Patent: Mar. 2, 2021

(54) BALL JOINT SENSOR

(71) Applicant: Ford Global Technologies, LLC, Dearborn, MI (US)

(72) Inventors: Brandon Mitchel, Farmington Hills, MI (US); Scott J. Lauffer, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 444 days.

(21) Appl. No.: 15/966,029

(22) Filed: Apr. 30, 2018

(65) Prior Publication Data

US 2019/0331574 A1 Oct. 31, 2019

(51) Int. Cl.
*G01M 17/06* (2006.01)
*G01N 3/56* (2006.01)
*F16C 11/06* (2006.01)
*F16C 41/00* (2006.01)
*G01M 17/04* (2006.01)
*B62D 7/16* (2006.01)

(52) U.S. Cl.
CPC ............ *G01N 3/56* (2013.01); *F16C 11/0628* (2013.01); *F16C 11/0647* (2013.01); *F16C 41/008* (2013.01); *G01M 17/04* (2013.01); *G01M 17/06* (2013.01); *B62D 7/16* (2013.01); *F16C 2326/24* (2013.01)

(58) Field of Classification Search
CPC ........ G01M 17/04; G01M 17/06; G01N 3/56; F16C 11/0628; F16C 11/0647; F16C 41/008; F16C 2326/24; B62D 7/16

USPC .............................. 73/117.01, 117.02, 117.03
See application file for complete search history.

(56) References Cited

U.S. PATENT DOCUMENTS

| 4,365,421 | A | * | 12/1982 | Byrum | G01P 15/135 |
| | | | | | 200/220 |
| 5,672,023 | A | | 9/1997 | Lieber et al. | |
| 6,533,491 | B1 | | 3/2003 | Redele | |
| 6,592,284 | B1 | * | 7/2003 | Rechtien | F16C 11/0633 |
| | | | | | 29/511 |
| 6,688,165 | B2 | | 2/2004 | Heidemann | |
| 2004/0067096 | A1 | * | 4/2004 | Ersoy | B60G 7/005 |
| | | | | | 403/137 |
| 2006/0022420 | A1 | * | 2/2006 | Pressler | B62D 15/023 |
| | | | | | 280/93.512 |
| 2008/0199247 | A1 | * | 8/2008 | Spratte | F16C 11/0647 |
| | | | | | 403/27 |
| 2009/0087253 | A1 | * | 4/2009 | Spratte | F16C 17/24 |
| | | | | | 403/131 |
| 2009/0136288 | A1 | * | 5/2009 | Ersoy | F16C 11/0647 |
| | | | | | 403/76 |
| 2013/0022388 | A1 | * | 1/2013 | Carli | B62D 7/18 |
| | | | | | 403/39 |

(Continued)

FOREIGN PATENT DOCUMENTS

CN 101198800 A 6/2008
JP 4444901 B2 1/2010

*Primary Examiner* — Eric S. McCall
(74) *Attorney, Agent, or Firm* — Frank A. MacKenzie; Bejin Bieneman PLC (57) ABSTRACT

A ball joint assembly includes a ball including an outer surface and a recess in the outer surface, a cup including an inner surface and a protrusion on the inner surface, and a sensor programmed to detect friction between the cup and the ball from the protrusion engaging the recess.

19 Claims, 6 Drawing Sheets

(56) References Cited

U.S. PATENT DOCUMENTS

| | | | |
|---|---|---|---|
| 2013/0308995 A1* | 11/2013 | Girard | F16C 11/06 403/27 |
| 2016/0175116 A1* | 6/2016 | Bader | A61F 2/4684 606/86 R |
| 2017/0248505 A1* | 8/2017 | Holmes | F16C 11/0628 |
| 2017/0348855 A1* | 12/2017 | Abe | B25J 9/1664 |
| 2018/0202879 A1* | 7/2018 | González Gallegos | B66B 1/3484 |
| 2019/0118596 A1* | 4/2019 | Reddehase | B60G 21/055 |
| 2019/0120285 A1* | 4/2019 | Reddehase | F16C 11/0642 |

* cited by examiner

BALL JOINT SENSOR

BACKGROUND

Power steering systems provide assistance to operators when steering a vehicle, increasing a steering angle of the vehicle with less input from the operator. The power steering systems include connections that transfer rotation of a steering wheel to rotation of a vehicle wheel. The connections may include a ball joint between a steering rack and the vehicle wheel. When the ball joint requires replacing, a human operator may notice haptic feedback indicating a worn ball joint, e.g., vibrations in a steering wheel and/or an increased amount of input necessary to steer the vehicle. Based on this haptic feedback, the human operator is aware that the vehicle requires service to replace the ball joints. However, in an autonomous vehicle, a human operator may not interface with the steering wheel and, thus, will not sense the haptic feedback indicating a worn ball joint.

DETAILED DESCRIPTION

A ball joint assembly includes a ball including an outer surface and a recess in the outer surface, a cup including an inner surface and a protrusion on the inner surface, and a sensor programmed to detect friction between the cup and the ball from the protrusion engaging the recess.

The ball joint assembly may further include a bushing between the ball and the cup. The protrusion may engage the recess when a portion of the bushing between the protrusion and the recess is worn.

The ball joint assembly may further include a computer including a processor and a memory, the memory storing instructions executable by the processor to collect data about a steering gear output force from the sensor, and to determine that the protrusion is engaging the recess when the output data exceeds a predetermined output threshold.

The cup may include a plurality of protrusions. The protrusions may be arranged in a knurled pattern.

The protrusion may be a rib.

The protrusion and the recess may have mating shapes.

The recess may be a groove extending around the ball.

The ball may include a plurality of recesses.

The recess may extend around a circumference of the ball.

The recess may define a pair of edges in the outer surface.

A power steering system includes a motor, a steering rack engaged with the motor, a ball joint assembly connected to the steering rack including a ball and a cup, the ball having a recess and the cup having a protrusion, and a computer including a processor and a memory, the memory storing instructions executable by the processor to collect data about a steering gear output force from the motor, and to determine that the protrusion is engaging the recess when the output data exceeds a predetermined output threshold.

The power steering system may further include a bushing between the ball and the cup. The protrusion may engage the recess when a portion of the bushing between the protrusion and the recess is worn.

The cup may include a plurality of protrusions. The protrusions may be arranged in a knurled pattern.

The recess may be a groove extending around the ball.

The ball may include a plurality of recesses.

The recess may extend around a circumference of the ball.

With reference to the Figures, wherein like numerals indicate like parts throughout the several views, a ball joint assembly 10 in a vehicle 12 includes a ball 14, a cup 16, and a sensor 18. The ball 14 includes an outer surface 20 and a recess 22 in the outer surface 20. The cup 16 includes an inner surface 24 and a protrusion 26 on the inner surface 24. The sensor 18 is programmed to detect friction between the cup 16 and the ball 14 from the protrusion 26 engaging the recess 22.

When the protrusion 26 engages the recess 22, friction increases between the cup 16 and the ball 14. The increased friction may be detected by the sensor 18 as an increased amount of force applied to a steering column 28 to steer the vehicle 12. A computer 30 can determine that the increased force indicates that the cup 16 contacts the ball 14 and the ball joint assembly 10 requires replacing. Thus, an autonomous vehicle 12 can determine that the ball joint assembly 10 requires replacing without operator input.

When a computer 30 operates the vehicle 12, the vehicle is an "autonomous" vehicle 12. For purposes of this disclosure, the term "autonomous vehicle" is used to refer to a vehicle 12 operating in a fully autonomous mode. A fully autonomous mode is defined as one in which each of vehicle propulsion (typically via a powertrain including an electric motor and/or internal combustion engine), braking, and steering are controlled by the computer. A semi-autonomous mode is one in which at least one of vehicle propulsion (typically via a powertrain including an electric motor and/or internal combustion engine), braking, and steering are controlled at least partly by the computer as opposed to a human operator, without human input, e.g., to accelerator or brake pedals, or to a steering wheel. In a non-autonomous mode, i.e., a manual mode, the vehicle propulsion, braking, and steering are controlled by the human operator.

Figure 1:
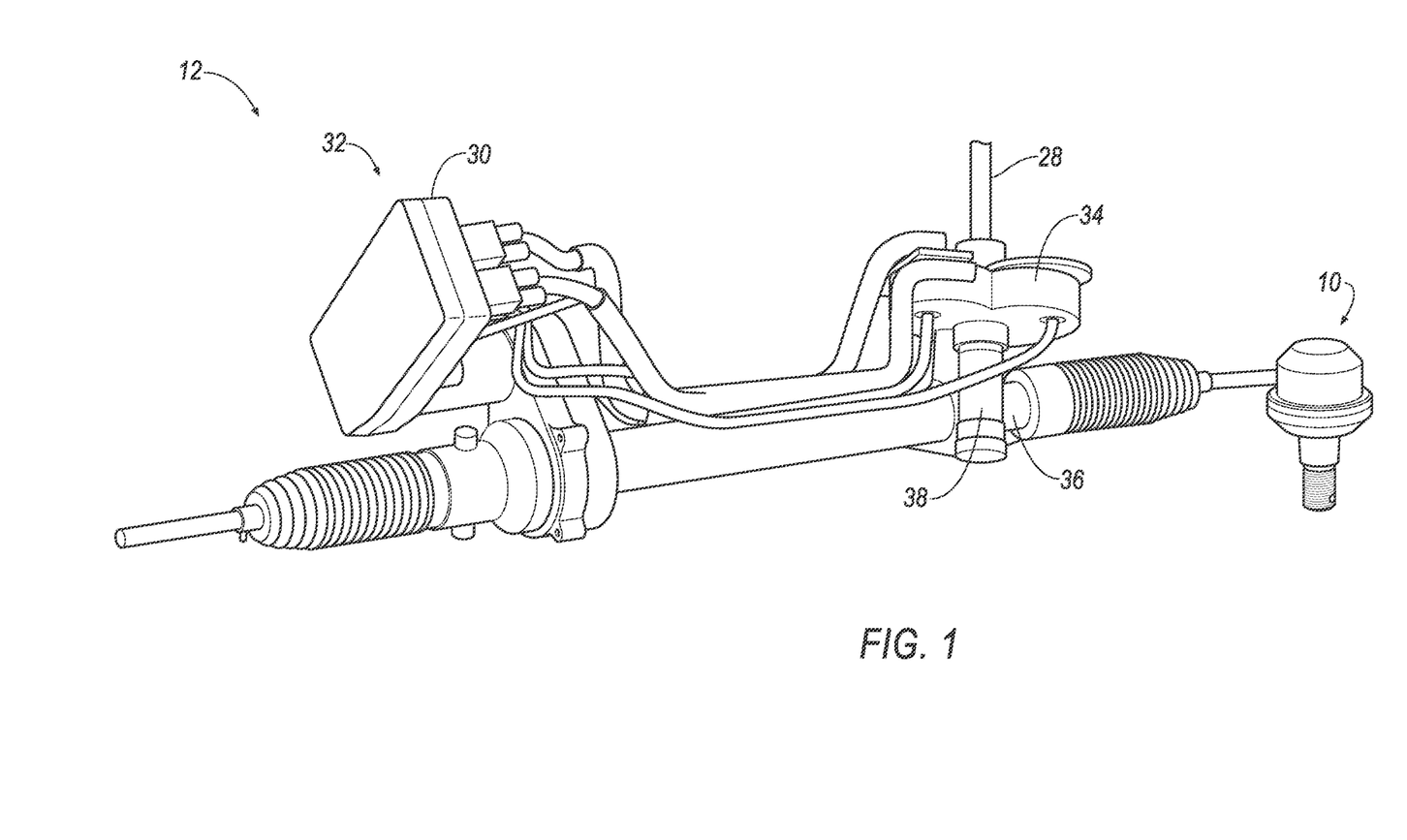
FIG. 1 is a view of a power steering system.

As shown in FIG. 1, the vehicle 12 includes a power steering system 32. The power steering system 32 provides additional steering input to steer the vehicle 12, allowing the vehicle 12 to turn with less input from the vehicle operator. The power steering system 32 includes a motor 34, the steering column 28, a steering rack 36, and the ball joint assembly 10. When the operator rotates the steering column 28 (e.g., with a steering wheel, not shown), the motor 34 rotates the steering column 28 in the direction that the operator started to rotate the steering column 28. This rotation from the motor 34 provides more rotation of the steering column 28 than rotation by the operator alone. Thus, the power steering system 32 allows the operator to rotate the steering column 28 with less effort. The steering column 28 then rotates the steering rack 36. The steering rack 36 then engages the ball joint assembly 10, which rotates the wheels (not shown) of the vehicle 12.

Figure 3:
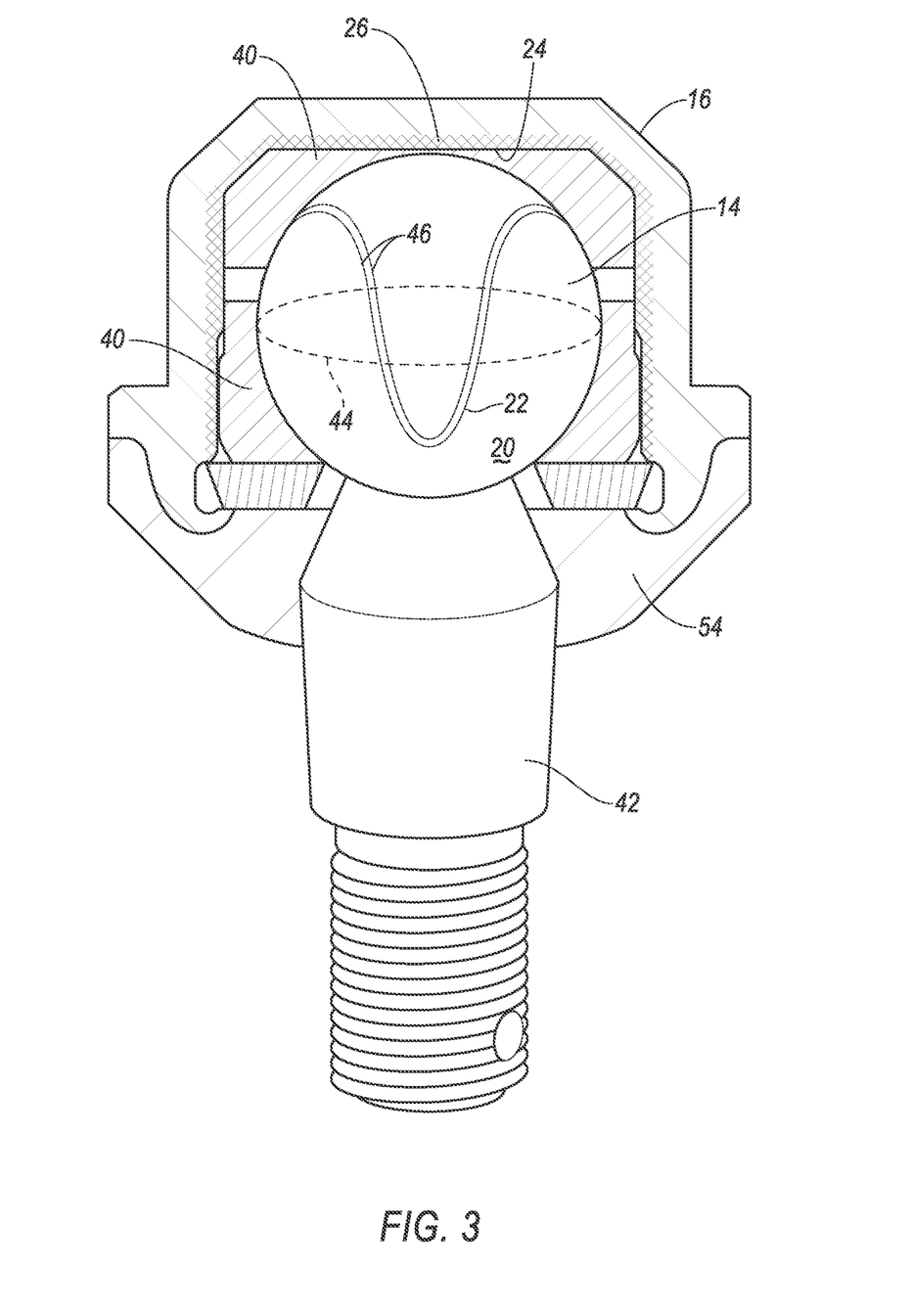
FIG. 3 is a cross-sectional view of the ball joint.

As shown in FIGS. 1 and 3, the power steering system 32 includes the motor 34. The motor 34 rotates the steering column 28. The motor 34 may be an electric motor, e.g., a brushed motor, a brushless motor, an AC motor, a DC motor, a PM motor, etc. The motor 34 may be actuated upon rotation of the steering wheel to assist rotation of the steering column 28. Thus, the motor 34 can increase rotation of the steering column 28 with less input from the vehicle operator or the computer. The motor 34 may be connected to a steering gear 38 engaged with the steering column 28. The motor 34 may rotate the steering gear 38, which rotates the steering rack 36.

As shown in FIG. 1, the power steering system 32 includes the steering column 28. The steering column 28 transfers rotation of the steering wheel to movement of the steering rack 36. The steering column 28 may be, e.g., a shaft connecting the steering wheel to the steering rack 36. When the operator rotates the steering wheel, the steering wheel may rotate the steering column 28. The rotation of the steering column 28 may rotate the steering rack 36 and the wheels, e.g., via the motor 34 and/or the steering gear 38.

As shown in FIG. 1, the power steering system 32 includes the steering rack 36. The steering rack 36 transfers rotational motion of the steering column 28 to rotation of the ball joint assembly 10. The steering rack 36 may be, e.g., a rigid bar or shaft having teeth engaged with the steering column 28. The steering rack 36 may be engaged with the motor 34 via the steering gear 38.

Figure 2:
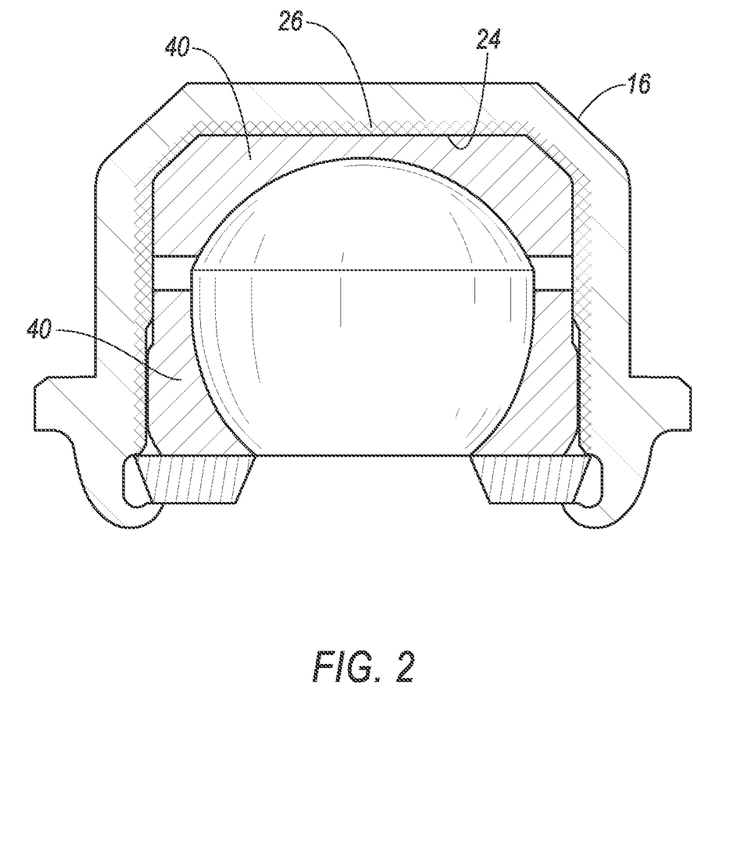
FIG. 2 is a cross-sectional view of a portion of a cup of a ball joint.

As shown in FIG. 1, the power steering system 32 includes the ball joint assembly 10. The ball joint assembly 10 is connected to the steering rack 36. As shown in FIG. 2, the ball joint assembly 10 includes the ball 14, the cup 16, and a bushing 40 between the ball 14 and the cup 16. The ball 14 rotates within the cup 16, rotating along the bushing 40. The steering rack 36 moves the ball joint assembly 10, which moves the wheels of the vehicle 12.

Figure 4:
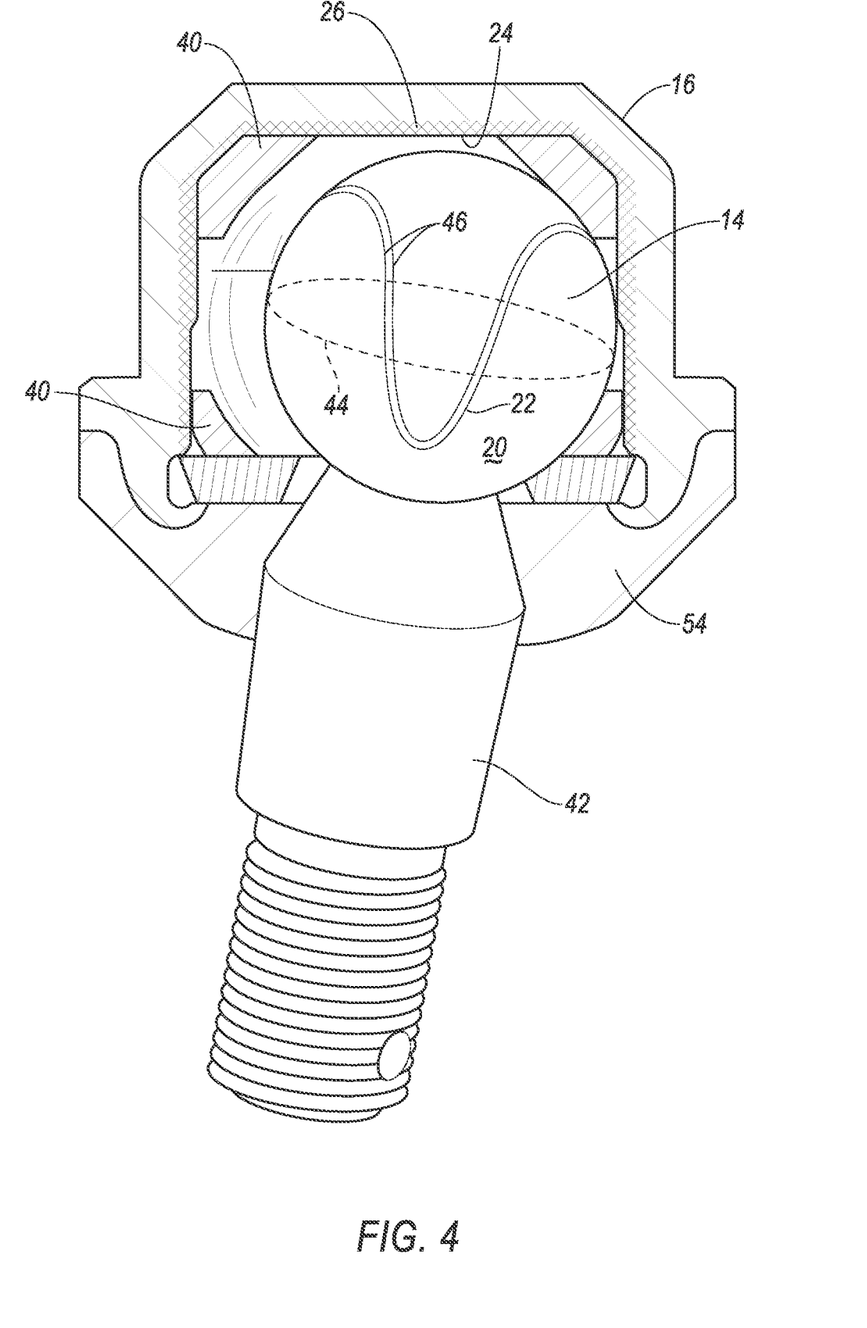
FIG. 4 is a cross sectional view of the ball joint when a bushing is worn.

As shown in FIGS. 2-4, the ball joint assembly 10 includes the bushing 40. The bushing 40 prevents wear on the cup 16 by friction between the ball 14 and the cup 16. The bushing 40 may be constructed of a polymer, e.g., polyurethane, nylon, Teflon®, etc. The bushing 40 may be a two-piece construction, as shown in FIGS. 2-4. Alternatively, the bushing 40 may be a unitary construction. As the ball 14 rotates against the bushing 40, friction between the ball 14 and the bushing 40 wears away the bushing 40, as shown in FIG. 4. When the bushing 40 wears away so that the ball 14 contacts the cup 16, the bushing 40 may be replaced. When the ball 14 contacts the cup 16, as shown in FIG. 4, friction may increase between the ball 14 and the cup 16, resulting in more effort from the operator to steer the vehicle 12. When operating in the autonomous mode, the computer 30 may not immediately detect the increased friction between the ball 14 and the cup 16. Thus, by increasing the friction between the ball 14 and the cup 16 and then detecting the increased friction, the computer 30 may determine that the bushing 40 is worn and requires replacing.

As shown in FIGS. 3-4, the ball joint assembly 10 includes the ball 14. The ball 14 is a substantially spherical object that rotates in the ball joint assembly 10. The ball 14 transfers linear motion from the steering rack 36 to rotational motion to the wheels. The ball 14 may be constructed of, e.g., a metal. The ball 14 may be connected to a shaft 42. The shaft 42 may be connected to the wheels. Thus, rotation of the ball 14 transfers linear motion of the steering rack 36 to the wheels via the shaft 42.

As shown in FIGS. 3-4, the ball 14 includes the outer surface 20. The ball 14 defines the recess 22 in the outer surface 20. The recess 22 is a space formed in the outer surface 20 separating one portion of the outer surface 20 from another portion of the outer surface 20. For example, the recess 22 may be a groove, a channel, a depression, etc. The recess 22 in FIGS. 3-4 is shown having a curved shape, and the recess 22 may have any suitable shape in the outer surface 20.

As shown in FIGS. 3-4, the recess 22 may extend around a circumference 44 of the ball 14. As used herein, a "circumference" 44 of a spherical object such as the ball 14 is the intersection between the surface of the spherical object and a plane intersecting the center point of the spherical object, e.g., a great circle, an orthodrome, etc. When the recess 22 extends around the circumference 44 of the ball 14, the recess 22 extends along at least one great circle of the ball 14. The recess 22 may be designed to allow motion of the ball 14 against the bushing 40, i.e., the recess 22 may be designed not to interfere with rotation of the ball 14 against the bushing 40. The ball 14 may have a plurality of recesses 22, e.g., a plurality of spaced grooves, a plurality of spaced depressions, a plurality of cavities, etc.

The recess 22 may define a pair of edges 46 in the outer surface 20, as shown in FIGS. 3-4. The edges 46 indicate where the recess 22 is formed into the outer surface 20. The edges 46 may be smooth. Alternatively, the edges 46 may be sharp, pointed, etc. When the edges 46 engage the inner surface 24 of the cup 16, the edges 46 may generate friction from contact with the cup 16. The friction may increase the force required by the motor 34 to rotate the steering gear 38.

As shown in FIGS. 3-4, the ball joint assembly 10 may include a dust cover 54. The dust cover 54 prevents occluding material, e.g., dust, water, sand, snow, debris, etc., from entering the cup 16 and interfering with rotation of the ball 14. The dust cover 54 may seal grease in the cup 16, allowing the ball 14 to rotate with reduced friction. The dust cover 54 may be constructed of a polymer, e.g., rubber, polyurethane, Teflon, nylon, etc.

The ball joint assembly 10 includes the cup 16, as shown in FIGS. 2-4. The ball 14 rotates in the cup 16, as shown in FIGS. 3-4. The cup 16 may be connected to the steering rack 36. As the steering rack 36 moves, the cup 16 transfers motion from the steering rack 36 to the ball 14, and thus to the wheels. The cup 16 includes the inner surface 24. The inner surface 24 may be substantially spherical. The inner surface 24 engages the bushing 40. When the bushing 40 is worn, as shown in FIG. 4, the outer surface 20 of ball 14 engages the inner surface 24 of the cup 16. As shown in FIGS. 2-4, the cup 16 and the bushing 40 may define a cavity in which the ball 14 seats. The cavity may be substantially spherical.

As shown in FIGS. 2-4, the cup 16 includes the inner surface 24. The cup 16 includes the protrusion 26 on the inner surface 24. The protrusion 26 may be an extension of material from the inner surface 24, e.g., a nub, a post, a rib, a hash, etc. The protrusion 26 may be positioned to engage the recess 22 during relative movement between the ball 14 and the cup 16. That is, the protrusion 26 may be constructed on the inner surface 24 to enter the recess 22 and then move out of the recess 22 as the ball 14 moves against the cup 16, causing friction between the ball 14 and the cup 16. The protrusion 26 may be positioned on the inner surface 24 such that the recess 22 may engage the protrusion 26 regardless of the position of the ball 14. For example, the protrusion 26 may be positioned adjacent to the circumference 44 along which the recess 22 extends, such that the recess 22 engages the protrusion 26 when the ball 14 rotates against the cup 16. The friction may increase a force applied to the steering gear 38 by the motor 34 to steer the vehicle 12. Furthermore, the protrusion 26 may engage the edges 46 of the recess 22, causing friction between the protrusion 26 and the edges 46.

The friction may be detected by the sensor 18, e.g., a force sensor 18, as described below.

The cup 16 may include a plurality of protrusions 26. The protrusions 26 may be arranged in a pattern along the inner surface 24. For example, as shown in FIGS. 2-4, the protrusions 26 may be arranged in a knurled pattern. Alternatively, the protrusions 26 may be arranged in, e.g., a cross-hatch pattern, a random pattern, a lattice pattern, etc. The protrusions 26 may be evenly spaced along the inner surface 24. Alternatively, the protrusions 26 may be spaced in an uneven or irregular pattern. The protrusions 26 may engage the recess 22 when a portion of the bushing 40 between the protrusion 26 and the recess 22 is worn, exposing the inner surface 24 of the cup 16 to the outer surface 20 of the ball 14.

The protrusions 26 and the recesses 22 may have mating shapes. For example, if the protrusions 26 are hemispherical nubs, and the recesses 22 are hemispherical depressions, then the protrusions 26 may mate in the recesses 22. When the protrusions 26 mate with the recesses 22, the friction between the ball 14 and the cup 16 may increase, increasing force applied to the steering gear 38 and improving detection of the worn bushing 40.

Figure 5:
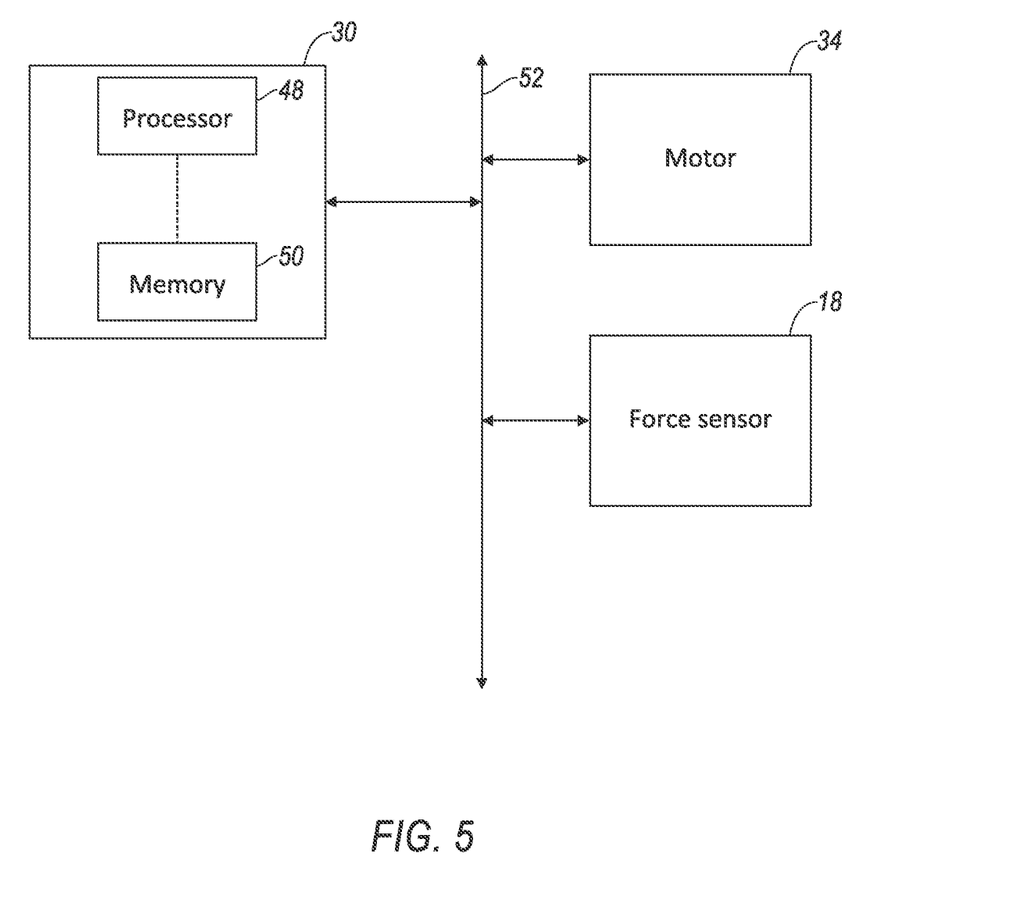
FIG. 5 is a block diagram of the power steering system.

As shown in FIG. 5, the power steering system 32 includes the computer 30. The computer 30 is programmed to receive data from one or more sensors 18. The computer 30 includes a processor 48 and a memory 50. The memory 50 stores instructions executable by the processor 48.

Communications between the computer 30, the sensors 18, the motor 34, and or other components in the vehicle 12, may be connected to a network 52, such as a controller area network (CAN) bus, of the vehicle 12. The computer 30 may use information from the network 52 to control the operation of the motor 34. Accordingly, the network 52 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The sensors 18 may include a variety of devices. For example, various controllers in a vehicle may operate as sensors 18 to provide data via the network 52, e.g., data relating to vehicle speed, acceleration, position, subsystem and/or component status, etc. Further, other sensors 18 could include cameras, motion detectors, etc., i.e., sensors 18 to provide data for evaluating a position of a component, evaluating a slope of a roadway, etc. The sensors 18 could, without limitation, also include short range radar, long range radar, LIDAR, and/or ultrasonic transducers. As shown in FIG. 3, the sensors 18 may include a force sensor 18.

The computer 30 may communicate with the motor 34 over the network 52. Upon receiving input to steer the vehicle 12, the computer 30 may actuate the motor 34 to assist rotating of the steering column 28. The computer 30 may thus actuate the motor 34 based on input from the operator (e.g., in a manual or semi-autonomous mode) and/or programming stored in the memory 50 (e.g., in an autonomous mode).

The power steering system 32 includes the force sensor 18. The force sensor 18 may detect a steering gear output force from the steering gear 38. When the motor 34 rotates the steering gear 38, the force sensor 18 can determine the amount of force applied by the steering gear 38 to rotate the steering rack 36, and thus the amount of force applied to steer the vehicle 12. When the bushing 40 is worn, the amount of force required to steer the vehicle 12 may increase from friction between the ball 14 and the cup 16. When the protrusion 26 engages the recess 22, the friction between the ball 14 and the cup 16 increases, and the force sensor 18 detects a greater steering gear output force to steer the vehicle 12 than when the protrusion 26 does not engage the recess 22. Thus, the increase in detected steering gear output force from the force sensor 18 may indicate that the bushing 40 is worn and that the ball joint assembly 10 should be replaced.

The computer 30 may be programmed to determine that the bushing 40 is worn and that the ball 14 is in contact with the cup 16. The computer 30 may be programmed to collect data about forces applied to the power steering system 32. The computer 30 may be programmed to actuate the force sensor 18 to collect data over the network 52 about the steering gear output force. The computer 30 may determine a steering gear output force based on the collected data.

The computer 30 may compare the steering gear output force to a predetermined threshold. The predetermined threshold may be a value that indicates that the bushing 40 is worn and the ball 14 is in contact with the cup 16, increasing friction in the ball joint assembly 10 and increasing the steering gear output force to steer the vehicle 12. The predetermined threshold may be a value higher than the detected force when the bushing 40 is intact and lower than the detected force when the bushing 40 is worn. The predetermined threshold may be a numerical value stored in the memory. The predetermined threshold may be determined based on, e.g., empirical testing of forces applied to ball joint assemblies 10, empirical testing of movement between the ball 14 and the cup 16 with differing protrusions 26 and recesses 22, etc.

When the steering gear output force exceeds the predetermined threshold, the computer 30 may determine that the bushing 40 is worn and the ball 14 is in contact with the cup 16. The protrusions 26 and the recesses 22 may increase friction between the ball 14 and the cup 16, increasing the steering gear output force. Thus, the steering gear output force may exceed the threshold when the bushing 40 is worn and the protrusions 26 engage the recesses 22. Upon determining that the bushing 40 is worn, the computer 30 may actuate the propulsion and brake to move the vehicle 12 to a repair location to replace the ball joint assembly 10. Alternatively or additionally, the computer 30 may send a notification to a vehicle operator indicating that the ball joint assembly 10 should be replaced.

Figure 6:
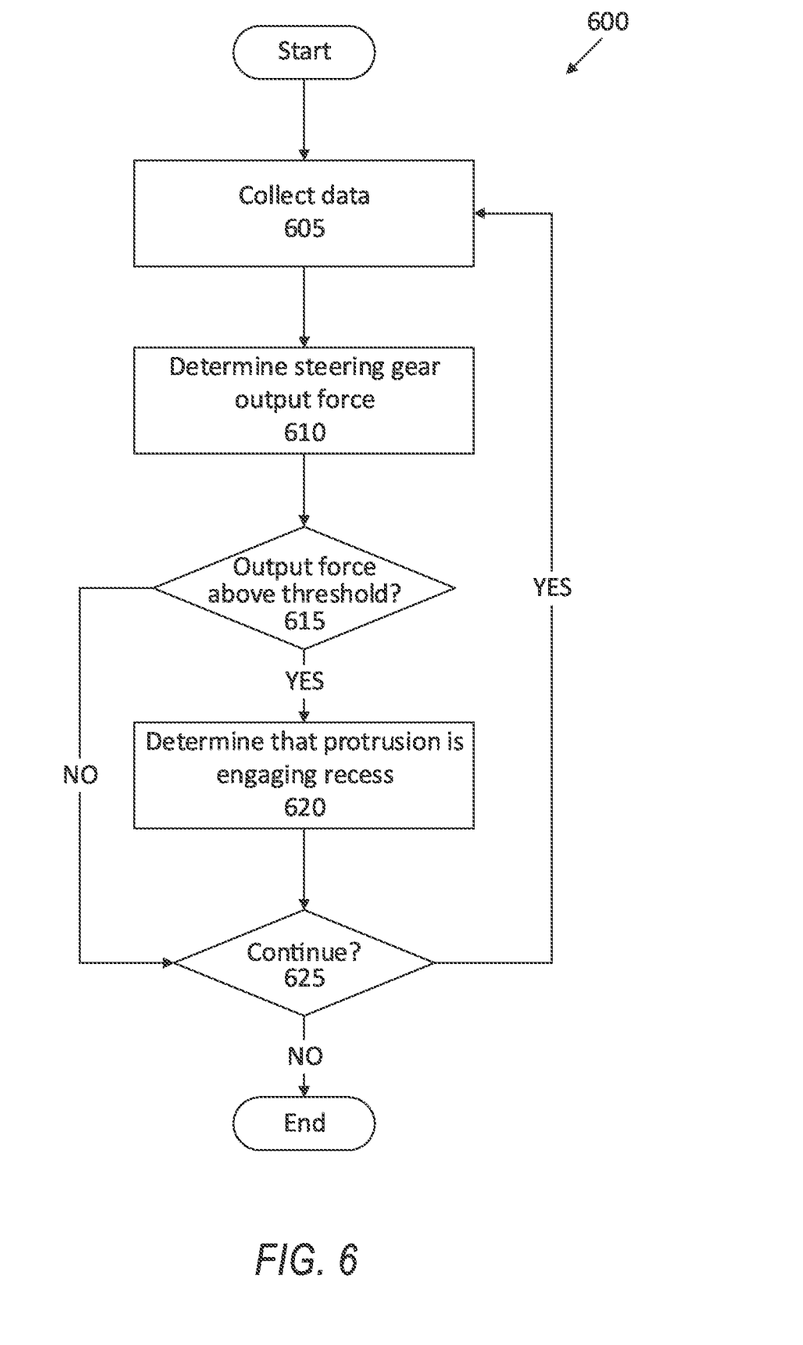
FIG. 6 is a block diagram of a process for detecting friction in the ball joint.

FIG. 6 illustrates a process 600 for detecting whether the bushing 40 is worn and the ball 14 is in contact with the cup 16. The process 600 begins in a block 605, in which the computer 30 actuates the force sensor 18 to collect friction data over the network 52 from the ball joint assembly 10. As described above, the force sensor 18 may detect friction between the ball 14 and the cup 16.

Next, in a block 610, the computer 30 determines the steering gear output force. Based on the collected data, the computer 30 can determine the force output from the steering gear 38 to move the steering rack 36 to steer the vehicle 12. As described above, the steering gear output force may indicate whether the steering gear 38 is applying additional force to overcome friction between the recess 22 of the ball 14 and the protrusion 26 of the cup 16.

Next, in a block 615, the computer 30 determines whether the steering gear output force is above a predetermined threshold. The predetermined threshold can be determined based on, e.g., empirical testing of ball joint assemblies 10 and data of the friction generated from contact between differing protrusions 26 and recesses 22. If the steering gear output force is above the predetermined threshold, the process 600 continues in a block 620. Otherwise, the process 600 continues in a block 625.

In the block 620, the computer 30 determines that the protrusion 26 is engaging the recess 22 and that the bushing 40 is worn. As described above, based on the determination, the computer 30 may actuate one or more components, e.g., a propulsion, a brake, etc., to move the vehicle 12 to a repair location to replace the ball joint assembly 10. Alternatively or additionally, based on the determination, the computer 30 may send a notification to a vehicle operator, e.g., over the network 52 to a user device of the operator.

In the block 625, the computer determines whether to continue the process 600. For example, if the computer 30 determines that the output force is below the threshold, the computer 30 may determine to continue the process 600 until detecting the output force above the threshold. In another example, if the computer 30 determines that the output force is above the threshold, the computer may determine not to continue the process 600. In yet another example, if the vehicle 12 is stopped and powered off, the computer 30 may determine not to continue the process 600. If the computer 30 determines to continue, the process 600 returns to the block 605 to collect more data. Otherwise, the process 600 ends.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A ball joint assembly, comprising:
   a ball including an outer surface and a recess in the outer surface;
   a cup including an inner surface and a protrusion on the inner surface;
   a bushing between the ball and the cup; and
   a sensor programmed to detect a change in a steering gear output force, the steering gear output force indicating friction between the protrusion on the inner surface of the cup engaging the recess of the outer surface of the ball.

2. The ball joint assembly of claim 1, wherein the protrusion engages the recess when a portion of the bushing between the protrusion and the recess is worn.

3. The ball joint assembly of claim 1, further comprising a computer including a processor and a memory, the memory storing instructions executable by the processor to:
   collect data about the steering gear output force from the sensor; and
   determine that the protrusion is engaging the recess when the output data exceeds a predetermined output threshold.

4. The ball joint assembly of claim 1, wherein the protrusion is a rib.

5. The ball joint assembly of claim 1, wherein the protrusion and the recess have mating shapes.

6. The ball joint assembly of claim 1, wherein the recess is a groove extending around the ball.

7. The ball joint assembly of claim 1, wherein the ball includes a plurality of recesses.

8. The ball joint assembly of claim 1, wherein the recess extends around a circumference of the ball.

9. The ball joint assembly of claim 1, wherein the recess defines a pair of edges in the outer surface.

10. The ball joint assembly of claim 1, wherein the cup includes a plurality of protrusions.

11. The ball joint assembly of claim 10, wherein the protrusions are arranged in a knurled pattern.

12. A power steering system, comprising:
    a motor;
    a steering rack engaged with the motor;
    a ball joint assembly connected to the steering rack including a ball, a cup, and a bushing between the ball and the cup, the ball having a recess and the cup having a protrusion;
    a force sensor programmed to detect a change in a steering gear force, the steering gear output force indicating friction between the protrusion of the cup engaging the recess of the ball; and
    a computer including a processor and a memory, the memory storing instructions executable by the processor to:
    collect data about a steering gear output force from the force sensor upon actuation of the motor; and
    determine that the protrusion is engaging the recess when the output data exceeds a predetermined output threshold.

13. The power steering system of claim 12, wherein the protrusion engages the recess when a portion of the bushing between the protrusion and the recess is worn.

14. The power steering system of claim 12, wherein the recess is a groove extending around the ball.

15. The power steering system of claim 12, wherein the ball includes a plurality of recesses.

16. The power steering system of claim 12, wherein the recess extends around a circumference of the ball.

17. The power steering system of claim 12, wherein the cup includes a plurality of protrusions.

18. The power steering system of claim 17, wherein the protrusions are arranged in a knurled pattern.

19. A ball joint assembly, comprising:
    a ball including an outer surface;
    a cup including an inner surface;
    a bushing between the ball and the cup; and
    a sensor programmed to detect a change in a steering gear output force, the change in the steering gear output force indicating friction between the inner surface of the cup and the outer surface of the ball.

* * * * *